(12) United States Patent
May et al.

(10) Patent No.: US 8,111,757 B2
(45) Date of Patent: Feb. 7, 2012

(54) METHOD AND APPARATUS FOR VIDEO SIGNAL PROCESSING

(75) Inventors: Anthony R. May, Winchester (GB); Faisal Ishtiaq, Chicago, IL (US); Tamer Shanableh, Sharjah (AE)

(73) Assignee: Motorola Mobility, Inc., Libertyville, IL (US)

( * ) Notice: Subject to any disclaimer, the term of this patent is extended or adjusted under 35 U.S.C. 154(b) by 1080 days.

(21) Appl. No.: 11/863,526

(22) Filed: Sep. 28, 2007

(65) Prior Publication Data

US 2009/0086826 A1 Apr. 2, 2009

(51) Int. Cl.
- H04B 1/66 (2006.01)
- H04N 7/12 (2006.01)
- H04N 11/02 (2006.01)
- H04N 11/04 (2006.01)

(52) U.S. Cl. ......... 375/240.27; 375/240.23; 375/240.26; 341/159; 341/65; 341/67

(58) Field of Classification Search .................. None
See application file for complete search history.

(56) References Cited

U.S. PATENT DOCUMENTS

| | | | | |
|---|---|---|---|---|
| 5,512,953 | A * | 4/1996 | Nahumi ..................... 348/441 |
| 5,654,759 | A * | 8/1997 | Augenbraun et al. ... 375/240.03 |
| 6,233,283 | B1 * | 5/2001 | Chiu et al. ............... 375/240.27 |
| 7,388,521 | B2 * | 6/2008 | Lu et al. ..................... 341/51 |
| 2002/0021761 | A1 | 2/2002 | Zhang et al. |
| 2003/0138047 | A1 | 7/2003 | Orchard et al. |
| 2004/0223549 | A1 | 11/2004 | Karczewicz et al. |
| 2004/0252758 | A1 * | 12/2004 | Katsavounidis et al. .. 375/240.2 |
| 2005/0002337 | A1 | 1/2005 | Wang et al. |
| 2005/0063473 | A1 * | 3/2005 | Koyama et al. .......... 375/240.27 |
| 2005/0100091 | A1 * | 5/2005 | Hanamura et al. ....... 375/240.03 |
| 2005/0268200 | A1 * | 12/2005 | Garudadri et al. ............. 714/746 |
| 2006/0088098 | A1 * | 4/2006 | Vehvilainen ............. 375/240.03 |
| 2006/0093228 | A1 * | 5/2006 | Loukianov et al. ........... 382/236 |

(Continued)

FOREIGN PATENT DOCUMENTS

EP 0996291 A1 4/2000

(Continued)

OTHER PUBLICATIONS

Aaron et al. Systematic Lossy Forward Error Protection for Video Waveforms. 2003 IEEE.*

(Continued)

*Primary Examiner* — Ayaz Sheikh
*Assistant Examiner* — Peter Chau
(74) *Attorney, Agent, or Firm* — Stewart M. Wiener

(57) ABSTRACT

A first video signal processor (103) receives a first encoded video signal from which a video unit (201) generates a second encoded video signal, where the second encoded video signal is a reduced data rate version of the first encoded video signal. An error encoder (203) generates error redundancy data for the second encoded video signal and a multiplexer (207) generates output video data comprising the first encoded video signal and the error correcting data but not comprising the second encoded video signal. A second video processor (105) receives the output video data and a video unit (303) regenerates the second video signal from the first video signal. An error unit (305) detects errors for at least a first segment of the second video signal in response to the error redundancy data. A combiner (307) then generates combined video data by combining corresponding segments of the first encoded video signal and the second encoded video signal.

16 Claims, 5 Drawing Sheets

U.S. PATENT DOCUMENTS

| | | | |
|---|---|---|---|
| 2007/0013561 A1* | 1/2007 | Xu et al. | 341/50 |
| 2007/0116125 A1* | 5/2007 | Wada et al. | 375/240.16 |
| 2008/0031344 A1* | 2/2008 | Lu et al. | 375/240.19 |
| 2008/0037635 A1* | 2/2008 | Li | 375/240.12 |
| 2008/0046939 A1* | 2/2008 | Lu et al. | 725/90 |
| 2008/0069242 A1* | 3/2008 | Xu et al. | 375/240.24 |
| 2008/0189073 A1* | 8/2008 | Jagmohan et al. | 702/181 |

FOREIGN PATENT DOCUMENTS

| | | |
|---|---|---|
| EP | 1301038 | 4/2003 |
| EP | 1180282 | 5/2006 |

OTHER PUBLICATIONS

Sang Chol Park, "PCT International Search Report and Written Opinion," WIPO, ISA/KR, Korean Intellectual Property Office, Daejeon, Republic of Korea, Mar. 11, 2009.

Rane, et al., "Systematic Lossy Forward Error Protection for Error-Resilient Digital Video Broadcasting," Information Systems Laboratory, Stanford University, Stanford, Califrnia, USA. 8 pages.

R. Swann and N.G. Kingsbury, "Transcoding of MPEG-II for enhanced resilience to transmission errors" in Proc ICIP96, Lausanne, Switzerland, vol. 2, pp. 813-816, Nov. 1996.

* cited by examiner

METHOD AND APPARATUS FOR VIDEO SIGNAL PROCESSING

FIELD OF THE INVENTION

The invention relates to video signal processing and in particular, but not exclusively, to improving error resilience for broadcast distributed video signals.

BACKGROUND OF THE INVENTION

Transmission and distribution of video signals is increasingly performed using digitally encoded video signals. For example, digital terrestrial and satellite television broadcasting is gradually taking over from analogue broadcasting systems. Also, digital video signal is used for distribution via e.g. the internet or using magneto optical carriers such as Digital Versatile Discs etc.

In order to maintain manageable data rates and file sizes for digital video, complex video encoding and decoding algorithms are used that provide a very high degree of compression. Examples of popular standardized video codecs are the Motion Picture Expert Group's MPEG-2 and MPEG-4 Technical Standards.

However, a problem with most standardized video codecs is that they are very sensitive to bit errors e.g. occurring during the broadcasting, distribution and retrieval etc of the encoded video signal. This high sensitivity is in particular due to the video encoding algorithms reliance on prediction algorithms that predict video data based on characteristics of other video data. Also, the use of variable length codes for encoding video data results in a high sensitivity to bit errors. In order to reduce the propagation of errors, current standardised systems provide a number of error resiliency tools, such as limiting the range of prediction, introducing resynchronization markers and using reversible run length codes. Many standardized video codecs also provide layered coding schemes that allow multiple video encoding data sets (e.g. bitstreams) to be created that each have a different contribution to the final subjective quality of the decoded video. Different forward error correcting coding schemes can then be applied to the encoding data to allow the parts of the encoding data that have the largest contribution to quality to be more heavily protected than other parts.

Unfortunately, such error resilience schemes all introduce substantial amounts of additional error data thereby resulting in a substantial loss in coding efficiency for situations where the error characteristics are better than the scenario for which the coding is designed (e.g. when the video signal is transmitted over an error free channel). Consequently video signals are often encoded with little or completely without any error resiliency features.

However, if such an uncoded video signal needs to be transmitted over an error prone channel, then adding all but the simplest of the error resilience features requires decoding and re-encoding of the video signal which is a computationally intensive task.

The usual alternatives for adding error protection to a video signal are to protect the entire video signal using a forward error correcting code or to provide a checksum and retransmission service so that corrupted data can be detected and re-transmitted (e.g. as used in the well known Transmission Control Protocol, TCP).

However, the use of forward error correcting coding usually requires the error characteristics of the channel to be well known in advance of the transmission or requires that a worst case scenario is assumed thereby resulting in a higher error correcting data rate and reduced coding efficiency. Furthermore, as the error performance of error correcting codes tend to degrade steeply if the error rate increases beyond the level for which the code was designed, a substantial margin must typically be included. In particular, as error correcting codes tend to not degrade smoothly and gradually, it must be ensured that the system works with a data rate which ensures that the operating point never or very rarely reaches the situation where the coding performance is being degraded.

Furthermore, although the use of re-transmission techniques may be suitable for some systems, it is not practical for other systems. For example, re-transmission is unsuitable for some non-real time systems such as distribution of video signals by DVDs. Also, the use of retransmissions does not scale well if multiple users are receiving the same content as the retransmission resource requirement may quickly exceed the initial broadcasting resource.

Hence, when a video signal is e.g. to be broadcasted over networks with variable error characteristics (such as the Internet, digital television broadcasting or mobile wireless networks), current error resilience measures tend to be suboptimal.

Hence, an improved system for video processing would be advantageous and in particular a system allowing increased flexibility, improved backwards compatibility, facilitated implementation, smoother error performance degradation, improved quality, reduced data rate, improved coding efficiency and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a video signal processor comprising: a receiver for receiving input video data comprising a first encoded video signal and error redundancy data for a second encoded video signal, the second encoded video signal being a reduced data rate version of the first encoded video signal and the input video data not comprising the second encoded video signal; a video unit for generating the second encoded video signal from the first encoded video signal; an error unit for detecting an error for at least a first segment of the second video signal in response to the error redundancy data; and a combiner for generating combined video data by combining a second segment of the first encoded video signal corresponding to the first segment and the first segment in response to the detection of the error.

The invention may allow improved performance in a video system in which a video signal is e.g. distributed, broadcasted or communicated between different entities. An improved video signal comprising the combined video data may be generated. Improved error resilience may often be achieved and in particular reduced error sensitivity may be achieved while maintaining a high coding efficiency. In particular, an improved trade-off between error performance/resistance and data rate can be achieved.

In many embodiments, the invention may allow a more gradual or smooth video signal quality degradation for increasing error rates.

The video signal processor may specifically be a pre-processor for a video decoder thereby providing an improved backwards compatibility and/or facilitating introduction of the video signal processor to existing systems. The video signal processor may be efficiently implemented and/or have low resource requirements.

The error redundancy data may specifically be forward correction data and/or forward error detection data. The error redundancy data may specifically be redundant data generated by a forward error correcting coding of the second video signal at an encoder.

The input video data may specifically be a video bitstream and/or a video file. The input video data may specifically be an MPEG standardized bit stream (e.g. encoded in accordance with the MPEG-2 or MPEG-4 video encoding standards).

The first and second segments may be corresponding in that they cover the same image area and time interval block(s) in respectively the first and the second video signal. The first and second segments may specifically be the same video slice of the two signals.

The input video data may be a single layer video signal and/or the error redundancy data may be comprised in ancillary data fields of the input video data.

According to an aspect of the invention there is provided a video signal processor comprising: a receiver for receiving video data comprising a first encoded video signal; a video unit for generating a second encoded video signal from the first encoded video signal, the second encoded video signal being a reduced data rate version of the first encoded video signal; an error encoder for error encoding the second encoded video signal to generate error redundancy data for the second video signal; and an output unit for generating output video data comprising the first encoded video signal and the error redundancy data and not comprising the second encoded video signal.

The invention may allow improved performance in a video system in which a video signal is e.g. distributed, broadcasted or communicated between different entities. Output video data allowing improved video quality to be generated in the presence of errors may be generated. Improved error resilience may often be achieved and in particular reduced error sensitivity may be achieved while maintaining a high coding efficiency. In particular, an improved trade-off between error performance/resistance and data rate can be achieved.

In many embodiments, the invention may allow a more gradual or smooth video signal quality degradation for increasing error rates.

The video signal processor may specifically be a post-processor for a video encoder thereby providing an improved backwards compatibility and/or facilitating introduction of the video signal processor to existing systems. The video signal processor may be efficiently implemented and/or have low resource requirements.

The error redundancy data may specifically be forward error correction data and/or forward error detection data. The error redundancy data may specifically be redundant data generated by a forward error correcting coding of the second video signal.

The output video data may specifically be a video bitstream and/or a video file. The output video data may specifically be an MPEG standardized bit stream (e.g. encoded in accordance with the MPEG-2 or MPEG-4 video encoding standards).

The output video data may be a single layer video signal/bitstream and/or the error redundancy data may be comprised in ancillary data fields of the output video data.

The video signal processor may specifically generate a single layer video output signal wherein different error coding can be applied to different quality signals thereby allowing different protection levels for different quality signals. This may be achieved with the video output signal comprising only a single encoded video signal and without requiring video encoding data for different quality levels.

According to an aspect of the invention there is provided a method of video signal processing comprising: receiving input video data comprising a first encoded video signal and error redundancy data for a second encoded video signal, the second encoded video signal being a reduced data rate version of the first encoded video signal and the input video data not comprising the second encoded video signal; generating the second encoded video signal from the first encoded video signal; detecting an error for at least a first segment of the second video signal in response to the error redundancy data; and generating combined video data by combining a second segment of the first encoded video signal corresponding to the first segment and the first segment in response to the detection of the error.

According to an aspect of the invention there is provided a method of video signal processing comprising: receiving video data comprising a first encoded video signal; generating a second encoded video signal from the first encoded video signal, the second encoded video signal being a reduced data rate version of the first encoded video signal; error encoding the second encoded video signal to generate error redundancy data for the second video signal; and generating output video data comprising the first encoded video signal and the error redundancy data and not comprising the second encoded video signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a distribution system for a video signal and in particular to a distribution system wherein an MPEG-2 encoded video bitstream is transmitted through a communication channel introducing communication errors to the transmitted bitstream. The system does not use any retransmission techniques and may specifically be a broadcasting system. It will be appreciated that the invention is not limited to this application but may be applied to many other systems.

Figure 1:
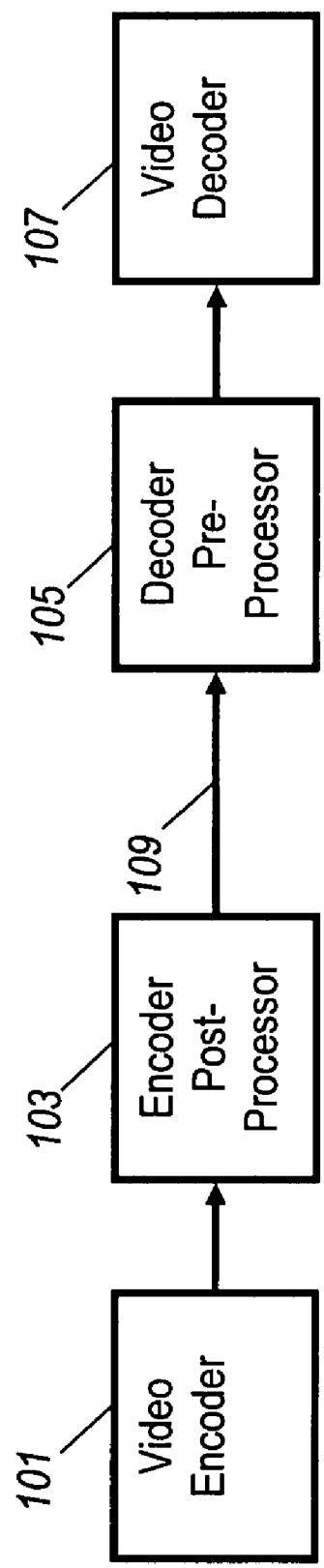
FIG. 1 illustrates a video signal distribution system in accordance with some embodiments of the invention.

FIG. 1 illustrates a video signal distribution system in accordance with some embodiments of the invention.

The video signal distribution system comprises a video encoder 101 which encodes a video signal in accordance with a suitable video encoding algorithm. In the specific example, the video encoder 101 is an MPEG-2 video encoder generating MPEG-2 video data in the form of a video bitstream.

The video encoder 101 is coupled to an encoder post-processor 103 which receives the MPEG-2 encoded video bitstream. The encoder post-processor 103 generates additional error redundancy data as will be described later. The error redundancy data is combined with the received MPEG-2 video data from the video encoder 101 to generate output video data which is also in the form of an MPEG-2 bitstream. In particular, the error redundancy data is included in the private data fields of the MPEG-2 bitstream.

The MPEG-2 encoded video bitstream from the encoder post-processor 103 is transmitted to a decoder arrangement comprising a decoder pre-processor 105 and a video decoder 107. The transmission of the MPEG-2 encoded bitstream is over a communication channel 109 which introduces errors to the bitstream. The communication may for example include communication via a cellular mobile telecommunication system, a wireless local area network, the Internet, television digital broadcast means etc. It will be appreciated that although FIG. 1 for brevity and clarity illustrates a point to point communication from the encoder arrangement 101, 103 to the decoder arrangement 105, 107, the output bitstream of the encoder post-processor 103 may be distributed to a plurality of decoder arrangements. For example, the encoder post-processor 103 may be part of a digital terrestrial television transmitter which broadcasts the bitstream.

The decoder pre-processor 105 receives the bitstream and extracts the error redundancy data and uses this to generate an improved encoded video signal which is fed to the video decoder 107. In the example, the video decoder 107 is a standard MPEG-2 video decoder 107 performing an MPEG-2 decoding which corresponds to the MPEG-2 encoding performed by the video encoder 101.

Figure 2:
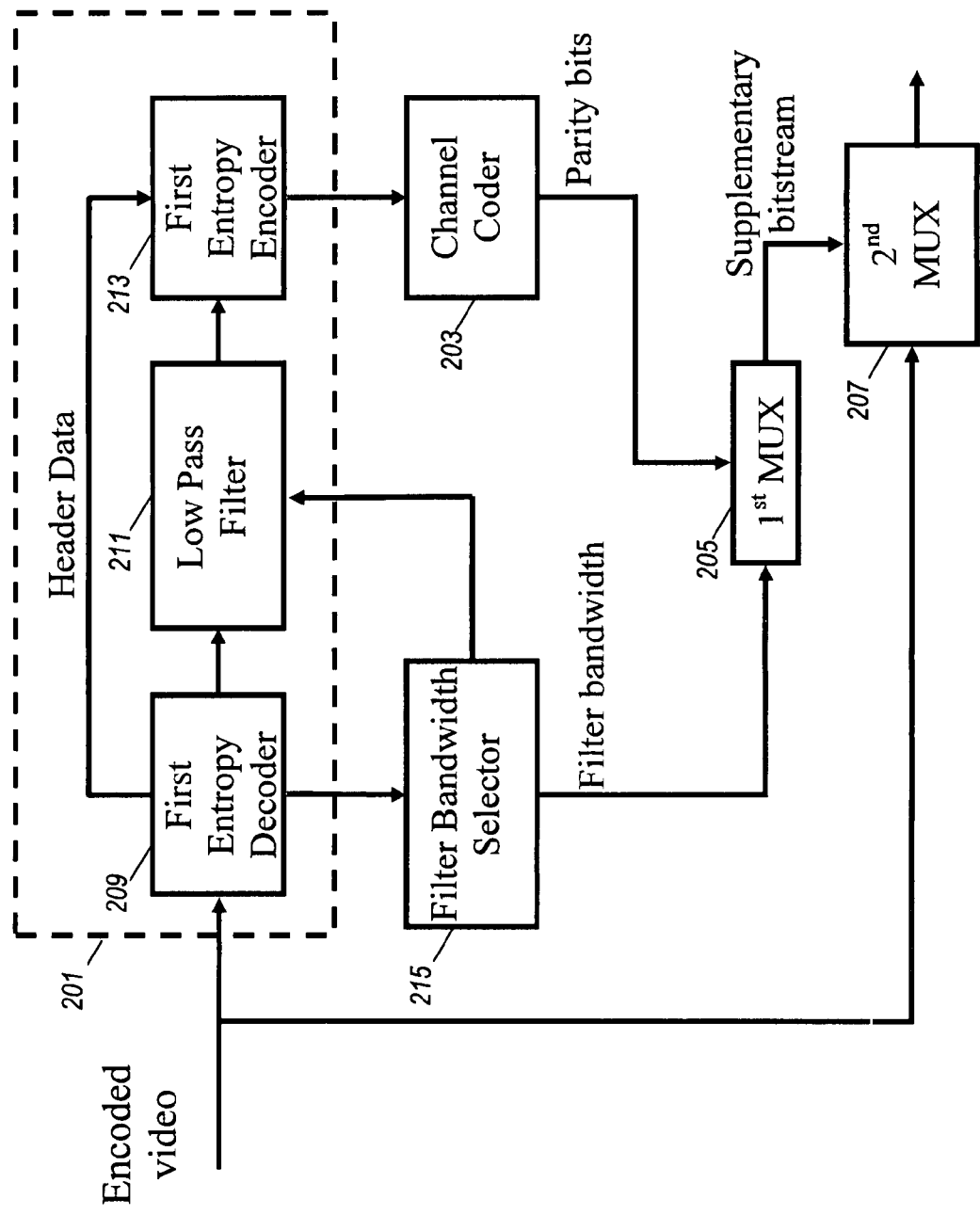
FIG. 2 illustrates an encoder post-processor in accordance with some embodiments of the invention.

FIG. 2 illustrates the encoder post-processor 103 in more detail.

The encoder post-processor 103 receives the MPEG-2 encoded video bitstream from the video encoder 101. This bitstream comprises a first encoded video signal which is encoded in accordance with the MPEG-2 standard. The first video signal is fed to an encoder video unit 201 which proceeds to generate a second encoded video signal from the first encoded video signal. The second encoded video signal is generated as a reduced data rate version of the first encoded video signal and thus is directly derived from the first video signal but has a lower video quality and data rate than this.

Thus, the second encoded video signal is generated from the first encoded video signal by reducing the video encoding data rate of this signal. In the example, the second encoded video signal output from the encoder video unit 201 is an MPEG-2 encoded video signal which has a lower data rate than the MPEG-2 encoded video signal received from the video encoder 101.

The second encoded video signal is fed to a channel coder 203 which proceeds to perform a channel coding of this signal. In particular, the channel coder 203 applies a forward error correcting code to the data bits of the second encoded video signal.

The channel coder 203 may use any error protection coding scheme without detracting from the invention. For example, the channel coder 203 may e.g. use convolutional codes, concatenated convolutional codes, low-density parity check codes, turbo codes, repeat-accumulate codes, Reed-Solomon codes or digital fountain codes.

Thus, the channel coder 203 generates error redundancy data for the second encoded video signal which for example may be in the form of additional parity bits etc.

The error redundancy data is via a first multiplexer 205 (which will be described later) fed to a second multiplexer 207 which also receives the original MPEG-2 encoded first encoded video signal from the video encoder 101. The second multiplexer 207 combines the encoding data from the first encoded video signal and the additional error redundancy data in an output video data. In the specific example, an output bitstream is generated as an MPEG-2 bitstream by including the error redundancy data for the second video signal in the private data portions of the MPEG-2 bitstream received from the video encoder 101.

Thus, output video data (in the form of an MPEG-2 bitstream) is generated which comprises the original first encoded video signal from the video encoder 101 and error redundancy data for a second encoded video signal which is a reduced data rate version of the first video signal. However, the second encoded video signal is not itself included in the output data stream. Accordingly, the data rate of the original input video data to the encoder post-processor 103 is only increased by the data rate of the error redundancy data and not by the additional data rate of the second video signal which is used to generate the error redundancy data.

Thus, in contrast to a conventional multilayer codec wherein different error protection is provided to the different layers, the video encoding arrangement of FIG. 1 generates an output signal which comprises error redundancy data for an encoded video signal which is not itself included in the data stream. Thus, the error redundancy data is generated from and applies to data bits which are not themselves present in the bitstream. Also, in the specific example a single layer video bitstream is generated which can nevertheless provide different layers of error resilience and protection.

Figure 3:
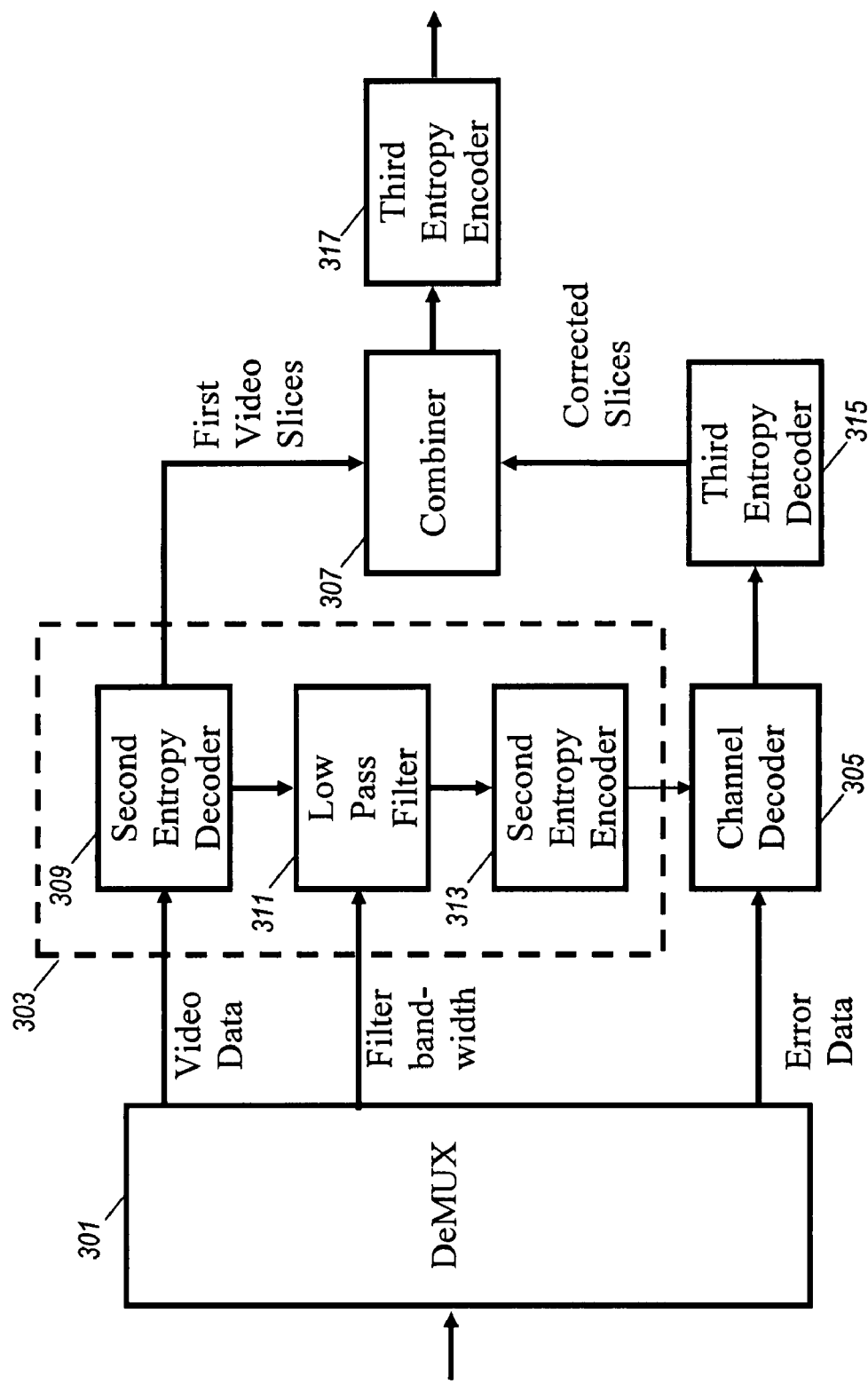
FIG. 3 illustrates a decoder pre-processor in accordance with some embodiments of the invention.

FIG. 3 illustrates the decoder pre-processor 105 in more detail.

The decoder pre-processor 105 comprises a demultiplexer 301 which receives the MPEG-2 encoded output video data bitstream from the encoder post-processor 103. Thus, the input video data which is received by the decoder pre-processor 105 comprises the first encoded video signal as well as the error redundancy data generated for the second encoded video signal. However, the input video data does not comprise the second encoded video signal itself.

The demultiplexer 301 is coupled to a decoder video unit 303 which is arranged to regenerate the second encoded video signal from the first encoded video signal.

The decoder video unit 303 specifically applies the same signal processing to the received first encoded video signal as the video unit 201 applies in the encoder post-processor 103. Thus, the decoder video unit 303 specifically applies the same data reduction algorithm to the first encoded video signal. The processing of the encoder video unit 201 and the decoder video unit 303 is in the example bit identical such that in the absence of any errors in the communication channel 109 the exact same data bits will be generated for the second encoded video signal in the encoder post-processor 103 and the decoder pre-processor 105.

The decoder pre-processor 105 furthermore comprises a channel decoder 305 which is coupled to the decoder video unit 303 and the demultiplexer 301. The channel decoder 305 receives the error redundancy data from the received bitstream as well as the second encoded video signal from the decoder video unit 303. It then proceeds to apply the forward error correction decoding algorithm that corresponds to the forward error correction encoding algorithm used at the encoder post-processor 103.

In the specific example, the channel decoder 305 performs two functions. Firstly, it detects if an error has occurred in the generated second encoded video signal (and thus in the first encoded video signal as the second encoded video signal is generated therefrom) by applying a suitable error detection criterion. For example, parity check bits may be used to verify the received data.

In the example, the first and second video signals are divided into segments which specifically are video slices. It will be appreciated, that in other embodiments, other segments may be used. For example, segments covering the same time and image area blocks of the first and second encoded video signal may be defined and error detection may be performed for each of the segments.

The second purpose of the channel decoder 305 of the decoder pre-processor 105 is to perform data correction for the data of the second encoded video signal. Thus, any errors introduced by the communication channel 109 that affects the second encoded video signal may be attempted to be corrected. Specifically, the forward error correction decoding algorithm can use the error redundancy data to correct (up to a given point) the errors in the second video signal that arise from errors introduced in the communication channel 109. In the specific example, the channel decoder 305 performs a standard forward error correction channel decoding that inherently corrects and detects errors. For example, a standard Reed Solomon encoding of the second encoded video signal may be performed by the channel coder 203 and a standard Reed Solomon decoding of the regenerated second encoded video signal may be performed by the channel decoder 305 based on the received error redundancy data originally generated by the channel coder 203.

Thus, the channel decoder 305 generates an error corrected version of the second encoded video signal. Thus, in contrast to the originally received first encoded video signal, the error corrected second encoded video signal has much higher error resilience and is accordingly likely to provide a better video quality in the presence of significant errors despite being encoded at a lower data rate.

In the example, the first encoded video signal and the error corrected second encoded video signal are fed to a combiner 307 (in the example of FIG. 1, this is done indirectly via entropy decoders which will be described later).

The combiner 307 is arranged to generate combined video data by combining segments of the first and second encoded video signals. Specifically, for any segment wherein the channel decoder 305 has detected an error, the segment of the second encoded video signal is combined with the same segment of the first encoded video signal to generate a combined segment which is then included in the output (combined) video data. In the example, each segment corresponds to a video slice and thus data in corresponding video slices of the first and second encoded video signal may be combined to generate a combined video slice.

In a simple embodiment, selection combining may be used by the combiner 307. Thus, for each segment wherein the channel decoder 305 has detected an error, the combiner 307 may select the video encoding data from the error corrected second encoded video signal in preference to the video encoding data from the first encoded video signal. In all segments where no error is detected, the combiner 307 may select the video encoding data from the first encoded video signal and discard the video encoding data from the second encoded video signal.

Thus, the combined video data being output from the combiner 307 may be identical to the first encoded video signal except for the segments/video slices wherein errors have been introduced by the communication channel 109. In these segments/video slices, the video data is selected from the reduced encoding quality but much more error robust second encoded video signal.

Accordingly, the quality degradation following from communication errors may be reduced substantially and in particular such errors are much less likely to cause unacceptable degradation as is typically the case for video signals with no or little error protection. Furthermore, the coding efficiency is maintained high as the amount of error redundancy data required for a given error protection of the second encoded video signal is less than for the first encoded video signal due to the reduced data rate of the second encoded video signal.

In some embodiments, the combiner 307 may receive MPEG-2 compatible input bitstreams and may generate an MPEG-2 compatible output bitstream by selecting suitable MPEG-2 data from each of the input bitstreams depending on the error detection. Thus, the output of the combiner 307 may be an MPEG-2 bitstream which can be fed directly to the video decoder 107 which can decode this signal in accordance with the MPEG-2 standards. Thus, the video decoder 107 may be a standard MPEG-2 video decoder.

In the specific example, the data reduction performed by the encoder video unit 201 and the decoder video unit 303 is performed in the compressed video signal domain. However, the data reduction is performed on the quantized frequency domain transform coefficients and motion vector data without the final lossless compression that is typically applied in video encoding.

Specifically, video codecs typically comprise a hybrid coder that generates compressed video encoding data by applying a lossy encoding to the original video signal. This lossy encoding generates compressed video encoding data which has a much lower data rate than the original uncompressed signal. The lossy video encoding is based on compression algorithms that seek to provide a high trade-off between perceived video quality and data rate. A typical hybrid coder is based on the perception characteristics of a human viewer to compress the data as much as possible while reducing the resulting quality degradation as much as possible. Thus, the hybrid encoder performs a content specific encoding that takes image characteristics into account. For example, the presence of moving objects in a video sequence is detected and represented by motion estimation data, quantisation of different frequency bands is dependent on the value and perceptual importance of the frequency components etc.

The hybrid coder may specifically generate compressed video encoding data in the form of quantized frequency domain transform coefficients and motion vector data.

In typical video encoders, the compressed video encoding data is then processed by a lossless encoder to generate a more compact bitstream. This lossless encoding is referred to as entropy encoding and is a lossless compression that provides a more efficient representation of the compressed video encoding data. However, the encoding is lossless such that there is a direct and unambiguous relationship between the entropy encoded representation and the compressed video encoding data prior to this encoding. Thus, the entropy encoding is fully reversible, and from the entropy encoded bit sequence the exact bit sequence of the compressed video encoding data can be generated. Examples of entropy encoding include Huffman encoding, arithmetic encoding and context adaptive binary arithmetic encoding.

Thus, the output of the hybrid coder is compressed video encoding data that is generated in response to image content characteristics, human perception characteristics and/or acceptable quality degradation characteristics. In contrast, the lossless entropy encoding of this data is independent of all of these characteristics and merely performs a lossless bit compression entirely independent of the content of the data is (i.e. what the data represents).

In the system, the encoder video unit 201 comprises a first entropy decoder 209 which performs entropy decoding to remove the effect of the entropy encoding performed by the video encoder 101. Thus, the first entropy decoder 209 provides compressed video encoding data by performing a lossless (entropy) decoding of the first encoded video signal.

The encoder video unit 201 furthermore comprises a data reduction unit in the form of a low pass filter 211 which is coupled to the entropy decoder 209. In the example, a data reduction of the compressed encoded video data is thus performed by low pass filtering the video encoding data from the first encoded video signal.

In the specific example, the Discrete Cosine Transform (DCT) coefficients of the MPEG video encoding data obtained from the entropy decoding are low pass filtered by applying weights corresponding to a desired filter response. In the described system, an ideal (square transfer function) low pass filter is used corresponding to a simple discarding of all coefficients for frequencies above the cut-off frequency of the low pass filter. For example, the higher frequency coefficients may simply be set to zero.

The low pass filter 211 is coupled to a first entropy encoder 213 which is arranged to perform a lossless encoding of the output video encoding data from the low pass filter 211 in order to create a more compact representation of the compressed video signal. In particular, the first entropy encoder 213 may apply the same entropy encoding algorithm as that applied by the video encoder 101.

Due to the low pass filtering of the low pass filter 211, the output of the first entropy encoder 213 (i.e. the second encoded video signal) will have a lower quality and a lower data rate than the input to the encoder video unit 201 (i.e. the first encoded video signal). For example, setting higher frequency coefficients to zero results in high-frequency information being lost for the image but also allows the first entropy encoder 213 to perform a much higher compression resulting in a reduced data rate.

In the specific example, the first entropy decoder 209 furthermore provides associated data to the first entropy encoder 213. Specifically, some data of the MPEG-2 input bitstream may directly be copied to the MPEG-2 output bitstream of the encoder video unit 201. For example, the first entropy decoder 209 can extract header data (including motion vectors) and forward this data to the first entropy encoder 213 which can directly include this in the generated MPEG-2 bitstream.

The use of the low pass filter 211 to perform the data reduction used to generate the second encoded video signal has been found to provide particularly good trade-off between implementation practicality, video quality and error resilience.

However, it will be appreciated that many other data reduction techniques may alternatively or additionally be applied. For example, in some embodiments a data reduction may be achieved by changing quantisation levels for the compressed video signal. Specifically by increasing the level of quantisation, a reduced quality and data rate can be achieved. As another example, the data rate reduction unit may identify regions of interest in the video image and the encoding data for the second encoded video signal may be reduced to the identified regions of interest. Thus, in such an example, effectively only part of the video image will be encoded in the second encoded video signal thereby resulting in reduced quality and data rate.

The decoder video unit 303 performs the exact same processing as the encoder video unit 201. Thus, the decoder video unit 303 comprises a second entropy decoder 309 which performs lossless entropy decoding of the received video signal to generate compressed video encoding data. This data is fed to a data reduction unit which in the specific example is a low pass filter 311 identical to the low pass filter 211 of the encoder video unit 201. The low pass filter 311 is coupled to a second entropy encoder 313 which regenerates the second encoded video signal by entropy encoding the low pass filtered compressed video encoding data.

Thus, in the absence of any errors occurring in the communication channel 109 between the encoder post-processor 103 and the decoder pre-processor 105, the second encoded video signals generated by the encoder video unit 201 and the decoder video unit 303 are identical. However, any errors occurring in the communication channel 109 can result in a difference between the second encoded video signal generated by the encoder video unit 201 and that generated by the decoder video unit 303. Such errors in the second encoded video signal will be detected and corrected by the channel decoder 305 (unless the amount of errors exceeds the capability of the applied error correcting code).

In some embodiments, the low pass filtering does not use a constant filtering. For example, different encoder post-processors may apply different filter bandwidths and/or the same encoder post-processor 103 may use different low pass filtering for different video signals or may vary the characteristics of the low pass filtering with time depending on the current characteristics of the video signal.

In the example of FIG. 2, the encoder post-processor 103 comprises a filter bandwidth selector 215 which can select between different filter bandwidths of the low pass filter 211. In addition, the filter bandwidth selector 215 generates an encoding filter bandwidth indication which is an indication of the currently selected bandwidth. This indication is fed to the first multiplexer 205 which combines it with the error redundancy data from the channel coder 203. The combined data thus forms a supplementary bitstream which is added to the input video data. Specifically, the second multiplexer 207 includes the supplementary bitstream with the original MPEG-2 bitstream received from the video encoder 101.

In the example, the demultiplexer 301 of the decoder pre-processor 105 extracts the encoding filter bandwidth indication and feeds it to the low pass filter 311 which sets the filter bandwidth accordingly.

In the decoder pre-processor 105 of FIG. 3, the combiner 307 is arranged to operate in the compressed video encoding data domain wherein signals are not entropy encoded. Thus, the combining is performed directly on compressed video encoding data in the form of the quantized frequency domain transform coefficients and motion vector data.

Accordingly, the combiner 307 receives versions of the first and second encoded video signals after these have been entropy decoded. In the example, the first encoded video signal is received from the second entropy decoder 309 thereby allowing the same entropy decoder 309 to be used both to generate the video signal for combining and to generate the second encoded video signal. Furthermore, the second encoded video signal is fed from the channel decoder 305 to the combiner 307 via a third entropy decoder 315.

The combining of the segments of the first and second encoded video signal in the non-entropy encoded domain allows an improved and more complex combination to be performed in some scenarios. For example if only a region of interest (ROI) has been selected to be protected by the supplementary bitstream, then the combiner 307 can add error concealment data based on the input video data for the regions outside of the ROI to the error corrected ROI.

As another example, combined video data may be generated by combining the DCT coefficient values below the cut-off frequency of the low pass filter 313 from the segment of the error corrected second encoding video signal and the DCT coefficients above the cut-off frequency from the first encoded video signal. This may provide error free low frequency information combined with more detailed higher frequency information that is not available in the second signal.

In the example, the combiner 307 works in the non-entropy encoded domain and accordingly the output of the combiner 307 is in the example fed to a third entropy coder 317 which performs a lossless entropy encoding. Thus, the output of the third entropy coder 317 is an MPEG-2 compatible signal. This may allow a standard video decoder 107 to be used without any modifications.

It will be appreciated that in some embodiments, the combining may be performed in the entropy encoded domain. For example, in FIG. 3, the third entropy decoder 315 and the third entropy coder 317 may be removed (or bypassed) and the first video signal may be fed directly to the combiner 307 (bypassing the second entropy decoder 309). The combining performed by the combiner 307 may e.g. select between entropy encoded segments of the first and second video signals depending on whether an error was detected.

In some embodiments, the encoder post-processor 103 may furthermore comprise functionality for error encoding the first encoded video signal in order to generate second error redundancy data for the first video signal. This additional error redundancy data may thus be included in the output video bitstream from the encoder post-processor 103. For example, the additional error redundancy data may also be included in private data portions of the MPEG-2 signal.

Specifically, the encoder post-processor 103 may comprise a channel encoder that performs a forward error correcting coding of the video data of the first encoded video signal. The decoder pre-processor 105 can then comprise the complementary forward error correcting decoder thereby resulting in improved error performance for the first encoded video signal.

Such a system may for example allow an encoder post-processor to provide flexible error resilience to an unprotected encoded video signal. Several layers of error protection may be introduced while maintaining the encoded signal as a single layer encoded signal. For example, the first encoded video signal may be protected by an error code that will provide good performance in nominal conditions whereas the second encoded video signal may be protected by an error code that provides a higher error protection level thereby ensuring that the second encoded video signal can be decoded in more severe conditions. Such an approach will thus provide a more gradual degradation while maintaining a high coding efficiency.

Thus, the described system uses forward error correction to provide different levels of error protection in a single layered video bitstream. The encoder post-processor 103 operates in the compressed domain which allows it to process pre-encoded video which may e.g. have had no error resiliency features enabled when it was encoded. The encoder post-processor 103 generates a supplementary bitstream while leaving the original bitstream unchanged. The supplementary bitstream may be included in private data sections of the transmitted bitstream and can be used at the decoder pre-processor 103 to replace any parts of the original bitstream that have been corrupted during the transmission with a lower quality version of the corrupted part of the bitstream.

By only protecting a part of the bitstream, the approach allows a more gradual degradation in the presence of errors and in particular mitigates the typical sudden forward error correction degradation, i.e. the sudden drop in video quality that occurs when the channel error rate exceeds the error rate that the forward error correction code is designed for.

Also, because the encoder post-processor 103 protects only a small part of the bitstream, a stronger forward error correction code can be used with negligible impact on the total data rate required to transmit the original bitstream plus the supplementary stream. Hence two forward error correction codes can be specified, one which targets the typical error rate experience on the channel and is used to protect the main bitstream, and one which targets the maximum error rate expected on the channel and is used to generate the supplementary stream.

Figure 4:
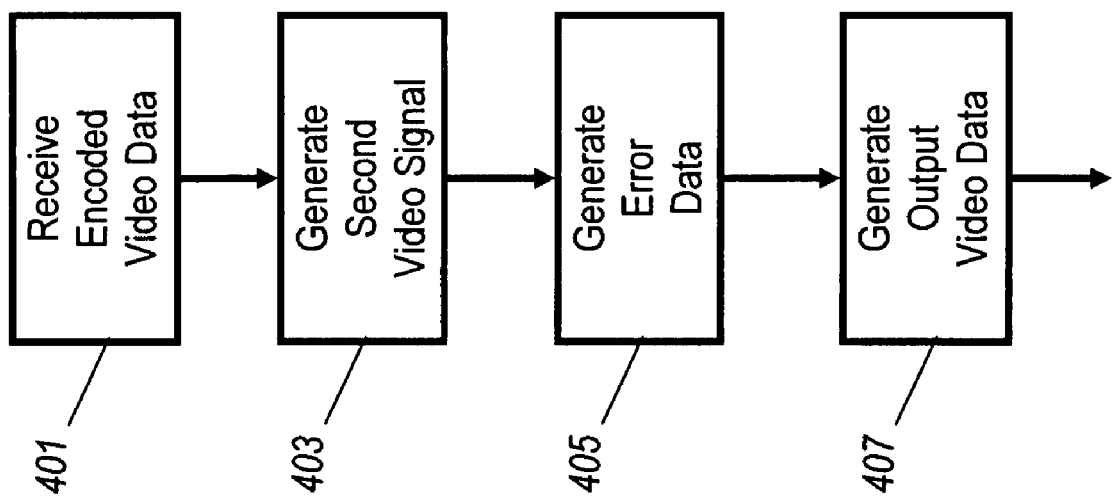
FIG. 4 illustrates an example of a method of video signal processing in accordance with some embodiments of the invention.

FIG. 4 illustrates an example of a method of video signal processing in accordance with some embodiments of the invention. The invention may e.g. be performed by the encoder post-processor 103 of FIGS. 1 and 2.

The method initiates in step 401 wherein a first encoded video signal is received.

Step 401 is followed by step 403 wherein a second encoded video signal is generated from the first encoded video signal. The second encoded video signal is a reduced data rate version of the first encoded video signal.

Step 403 is followed by step 405 wherein the second encoded video signal is error encoded to generate error redundancy data for the second encoded video signal.

Step 405 is followed by step 407 wherein video output data is generated comprising the first encoded video signal and the error correcting data but not comprising the second encoded video signal.

Figure 5:
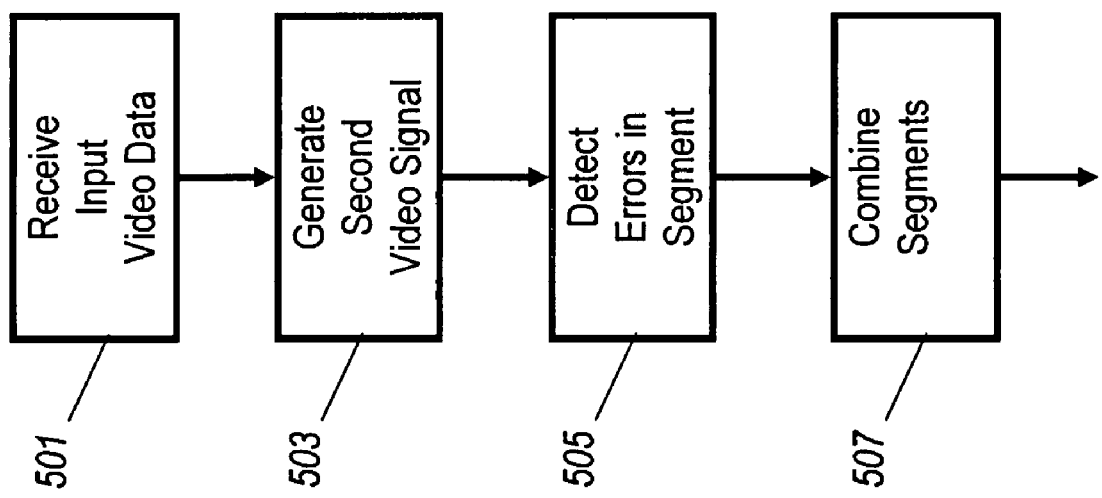
FIG. 5 illustrates an example of a method of video signal processing in accordance with some embodiments of the invention.

FIG. 5 illustrates an example of a method of video signal processing in accordance with some embodiments of the invention. The invention may e.g. be performed by the decoder pre-processor 103 of FIGS. 1 and 3.

The method initiates in step 501 wherein input video data is received comprising a first encoded video signal and error redundancy data for a second encoded video signal. The second encoded video signal is a reduced data rate version of the first encoded video signal and the input video data does not comprise the second encoded video signal.

Step 501 is followed by step 503 wherein the second encoded video signal is generated from the first encoded video signal.

Step 503 is followed by step 505 wherein an error may be detected for at least a first segment of the second video signal in response to the error redundancy data.

Step 505 is followed by step 507 wherein combined video data is generated by combining a second segment of the first encoded video signal corresponding to the first segment and the first segment in response to the detection of the error.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A video signal processor comprising:
   a receiver for receiving input video data comprising a first encoded video signal and error redundancy data for a second encoded video signal, the second encoded video signal being a reduced data rate version of the first encoded video signal and the input video data not comprising the second encoded video signal;
   a video unit for generating the second encoded video signal from the first encoded video signal;
   an error unit for detecting an error for at least a first segment of the second encoded video signal in response to the error redundancy data; and
   a combiner for generating combined video data by combining a second segment of the first encoded video signal corresponding to the first segment and the first segment in response to the detection of the error;
   wherein the video unit comprises:
   a lossless decoding unit for generating first video encoding data for the first encoded video signal;
   a data reduction unit for generating second video encoding data for the second encoded video signal by applying a data reduction to the first video encoding data.

2. The video signal processor of claim 1 wherein the combiner is arranged to combine the second segment and the first segment by selecting the first segment if the error is detected and the second segment if the error is not detected.

3. The video signal processor of claim 1 wherein the error unit is arranged to correct at least one error of the first segment in response to the error redundancy data.

4. The video signal processor of claim 1 wherein the combiner unit is arranged to combine the first segment and the second segment by combining the first video encoding data and non-losslessly compressed second video encoding data.

5. The video signal processor of claim 4 further comprising a lossless encoding unit for losslessly compressing the combined video data.

6. The video signal processor of claim 1 further comprising a lossless encoding unit for losslessly compressing the second video encoding data of the second encoded video signal prior to the error unit detecting the error.

7. The video signal processor of claim 1 wherein the data reduction comprises a low pass filtering of the first encoded video data.

8. The video signal processor of claim 7 wherein the receiver is arranged to receive an encoding filter bandwidth indication for the second encoded video signal from an encoder; and the data reduction unit is arranged to adapt a filter bandwidth of the low pass filtering in response to the encoding filter bandwidth indication.

9. The video signal processor of claim 1 wherein the first segment is a video slice.

10. A video signal processor comprising:
    a receiver for receiving video data comprising a first encoded video signal;
    a video unit for generating a second encoded video signal from the first encoded video signal, the second encoded video signal being a reduced data rate version of the first encoded video signal;
    an error encoder for error encoding the second encoded video signal to generate error redundancy data for the second encoded video signal; and
    an output unit for generating output video data comprising the first encoded video signal and the error redundancy data and not comprising the second encoded video signal;
    wherein the video unit comprises:
    a lossless decoding unit for generating first video encoding data for the first encoded video signal;
    a data reduction unit for generating second video encoding data for the second encoded video signal by applying a data reduction to the first video encoding data.

11. The video signal processor of claim 10 further comprising a lossless encoding unit for losslessly compressing the second video encoding data of the second encoded video signal prior to the error encoder generating the error redundancy data.

12. The video signal processor of claim 10 wherein the lossless encoding unit is arranged to receive associated data of the first encoded video signal from the lossless decoding unit and to copy the associated data to the second encoded video signal.

13. The video signal processor of claim 10 wherein the data reduction comprises a low pass filtering of the first video encoding data.

14. The video signal processor of claim 13 further comprising a filter control unit arranged to generate an encoding filter bandwidth indication of a bandwidth of the low pass filtering and wherein the output unit is arranged to include the encoding filtering bandwidth indication in the output video data.

15. The video signal processor of claim 10 further comprising a second error encoder for error encoding the first encoded video signal to generate second error redundancy data for the first encoded video signal; and wherein the output unit is arranged to include the second error redundancy data in the output video data.

16. The video signal processor of claim 15 wherein an error protection level of the second encoded video signal is higher than an error protection level of the first encoded video signal.

* * * * *